US011555465B1

(12) United States Patent
Couzens et al.

(10) Patent No.: US 11,555,465 B1
(45) Date of Patent: Jan. 17, 2023

(54) SYSTEM AND METHOD FOR DIAGNOSING A CRANKCASE VENTILATION SYSTEM

(71) Applicant: Ford Global Technologies, LLC, Dearborn, MI (US)

(72) Inventors: Andrew Couzens, Southend-on-Sea (GB); Jonathan Saville, Dearborn, MI (US); Robert Jentz, Westland, MI (US); Matthew Russell Carpenter, Northville, MI (US); Michael Casedy, Ann Arbor, MI (US); Adam Krach, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/447,382

(22) Filed: Sep. 10, 2021

(51) Int. Cl.
| F01M 13/00 | (2006.01) |
| F02D 41/22 | (2006.01) |
| F02D 41/00 | (2006.01) |
| F01M 13/02 | (2006.01) |

(52) U.S. Cl.
CPC ............ *F02D 41/22* (2013.01); *F01M 13/00* (2013.01); *F02D 41/0007* (2013.01); *F01M 2013/0005* (2013.01); *F01M 2013/0083* (2013.01); *F01M 2013/027* (2013.01); *F01M 2250/60* (2013.01); *F02D 2250/08* (2013.01)

(58) Field of Classification Search
CPC ................ F02D 2250/08; F01M 13/00; F01M 2013/0083; F01M 2013/027

USPC ................. 73/114.33, 114.37; 123/572–574
See application file for complete search history.

(56) References Cited

U.S. PATENT DOCUMENTS

| 9,416,694 | B2 | 8/2016 | Jentz et al. |
| 9,523,298 | B2 | 12/2016 | Pursifull et al. |
| 9,664,079 | B2 * | 5/2017 | Jentz .................. F02M 35/1038 |
| 10,794,244 | B2 * | 10/2020 | Yoo ..................... F01M 13/0011 |
| 11,280,288 | B2 * | 3/2022 | Tsuji ...................... F01M 13/04 |
| 2014/0081549 | A1 * | 3/2014 | Rollinger ............ F02D 41/0025 |
| | | | 701/101 |
| 2014/0081564 | A1 * | 3/2014 | Pursifull ............... G01M 15/08 |
| | | | 701/101 |
| 2016/0097355 | A1 * | 4/2016 | Jentz .................... F01M 13/021 |
| | | | 701/102 |

FOREIGN PATENT DOCUMENTS

| DE | 102016222117 A1 | 5/2018 |
| DE | 102018110747 B3 | 7/2019 |

* cited by examiner

*Primary Examiner* — Erick R Solis
(74) *Attorney, Agent, or Firm* — Vincent Mastrogiacomo; McCoy Russell LLP

(57) ABSTRACT

A method and a system for diagnosing positive crankcase ventilation (PCV) systems are disclosed. In one example, the method diagnoses a PCV system based on a pressure that may be observed during engine cranking. In another example, the PCV system is diagnosed during vehicle driving conditions after the engine exits cranking.

18 Claims, 6 Drawing Sheets

SYSTEM AND METHOD FOR DIAGNOSING A CRANKCASE VENTILATION SYSTEM

BACKGROUND/SUMMARY

Gases may be present in an engine crankcase when combustion gases from engine cylinders bypass engine pistons and enter the crankcase as an engine rotates. The gases may be combusted by the engine by recirculating the gases by way of a positive crankcase ventilation (PCV) system. In particular, the PCV system may include hoses that are external to the engine, and the hoses may allow the gases to be reintroduced to the engine in or upstream of the engine's intake manifold. The gases may then be combined with fresh air and fuel in the engine's cylinders where the combined mixture may be combusted. The PCV system may reduce pressure in the engine's crankcase so that there is less possibility of the gases passing through engine seals and entering the atmosphere. Nevertheless, it may be possible for a breach to occur within a hose so that operation of the PCV system degrades. Therefore, it may be desirable to provide a way of determining if a PCV system breach is present within a vehicle.

The inventors herein have recognized the above-mentioned disadvantages and have developed a method for operating an engine, comprising: storing a signal indicative of a pressure into memory of a controller for a predetermined amount of time in response to cranking an engine; and indicating a presence or absence of a positive crankcase ventilation (PCV) system breach in response to a length of the signal and an amplitude range of the signal.

By indicating degradation of a PCV system in response to a length of a signal and an amplitude range of the signal, it may be possible to provide greater separation between data that indicate PCV system degradation and data that indicate an absence of PCV system degradation so that PCV system diagnostics may be more reliable. In particular, combining signal length and signal amplitude range to evaluate PCV systems for degradation may allow PCV system data to be separated into four data quadrants so that data indicating PCV system degradation may be clearly separated from PCV system data indicating no PCV system degradation.

The present description may provide several advantages. In particular, the approach may provide reduce false positive and false negative PCV system degradation indications. In addition, the approach described herein provides for PCV system diagnostics during engine cranking and after engine cranking so that PCV systems may be evaluated even for hybrid vehicles where the engine may be operated only for a short period of time.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
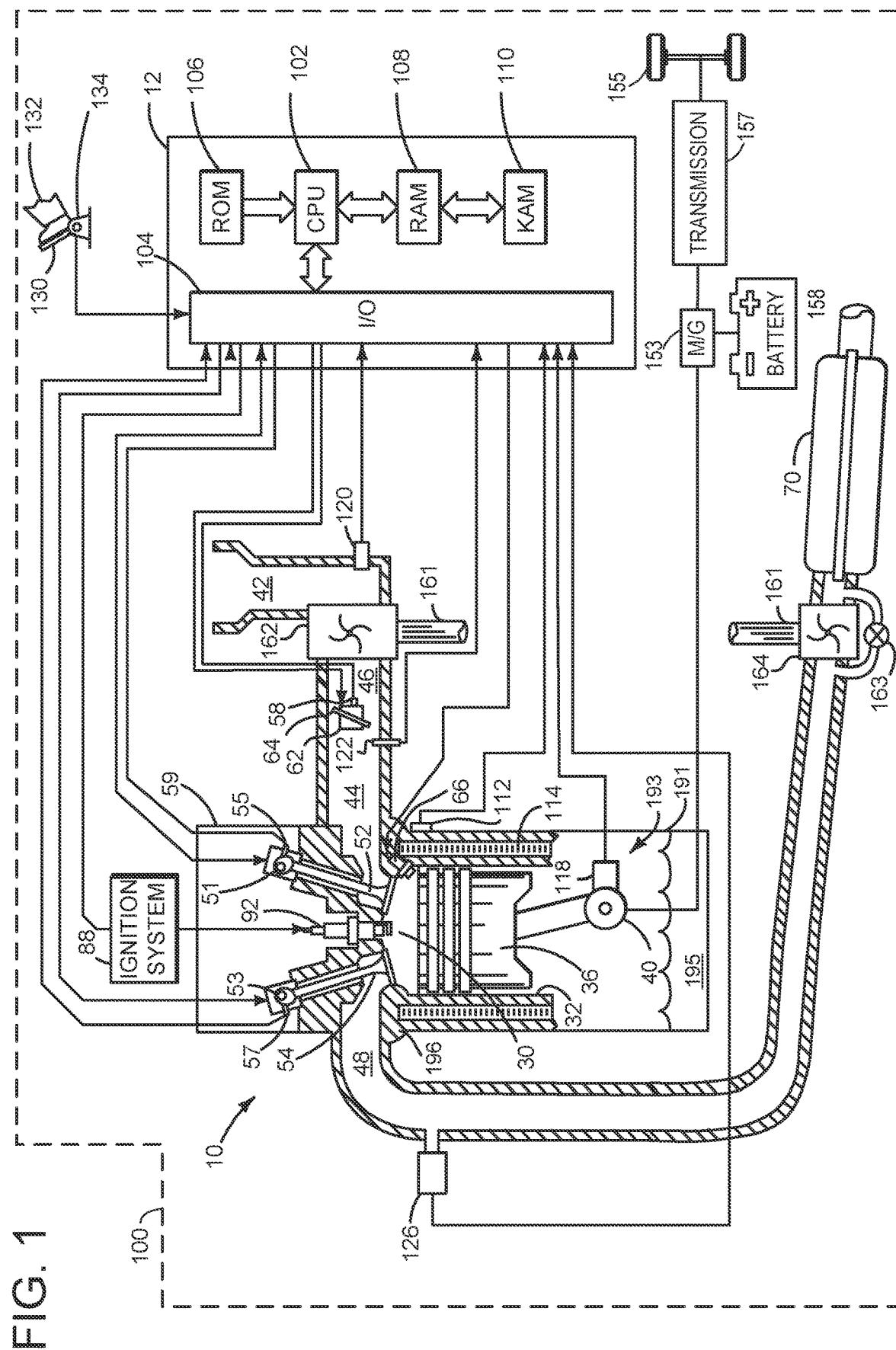
FIG. 1 shows a schematic depiction of one cylinder of an engine.
Figure 2:
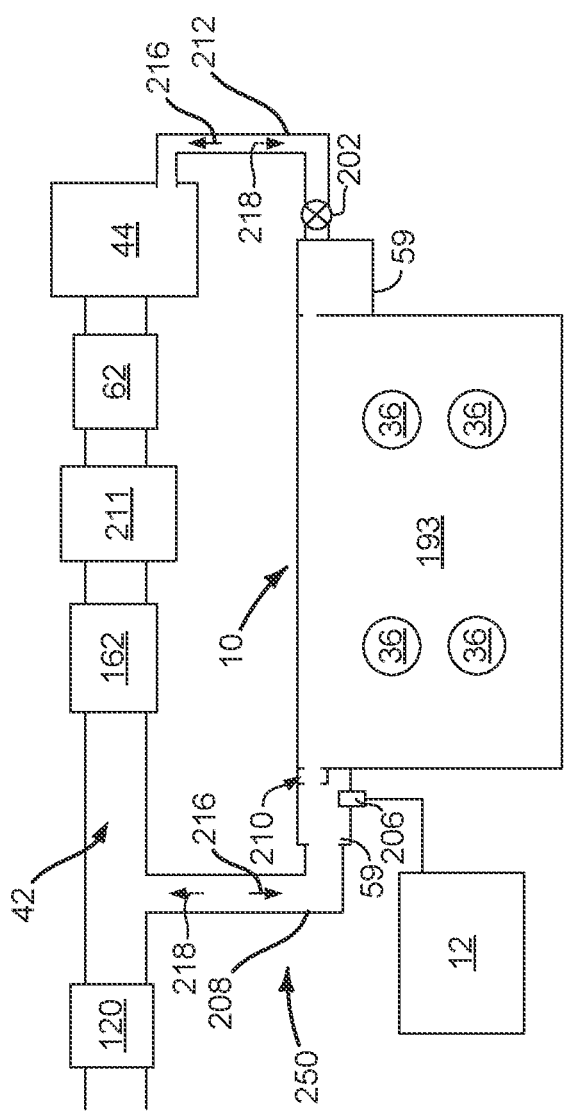
FIG. 2 shows a schematic depiction of the engine of FIG. 1 including a PCV system.
Figure 3:
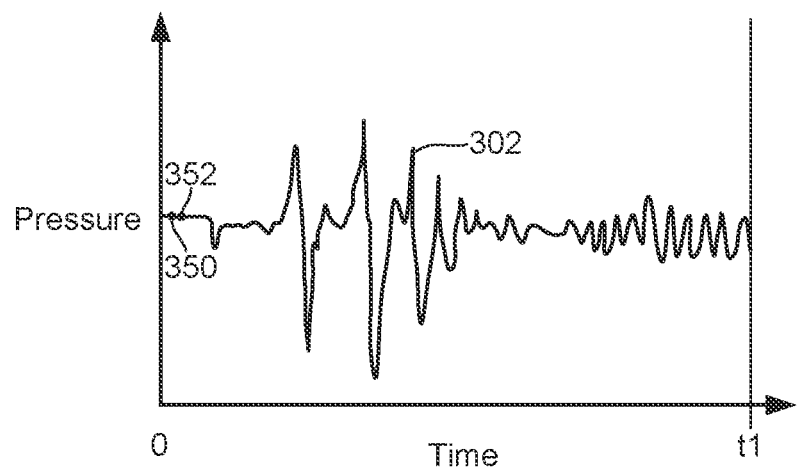
FIG. 3 shows PCV system signals.
Figure 3:
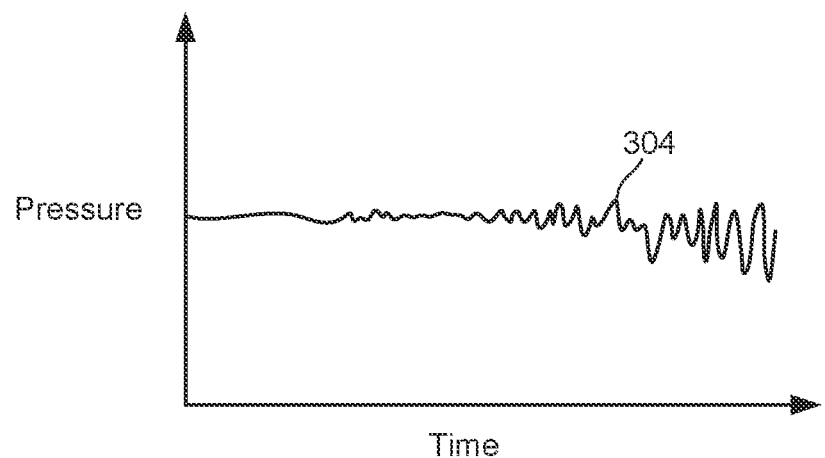
Figure 4:
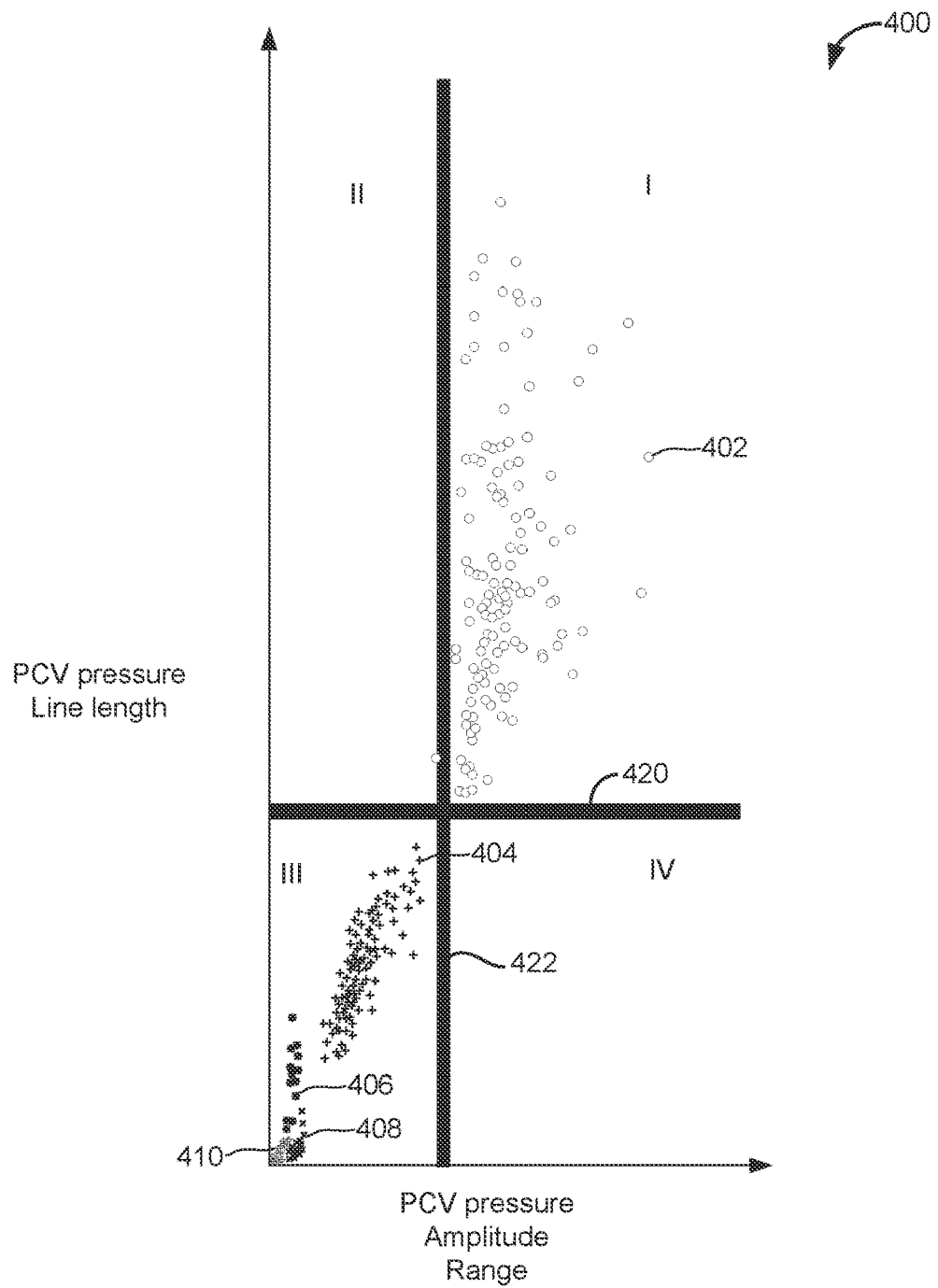
FIG. 4 shows a plot of PCV system data.
Figure 5:
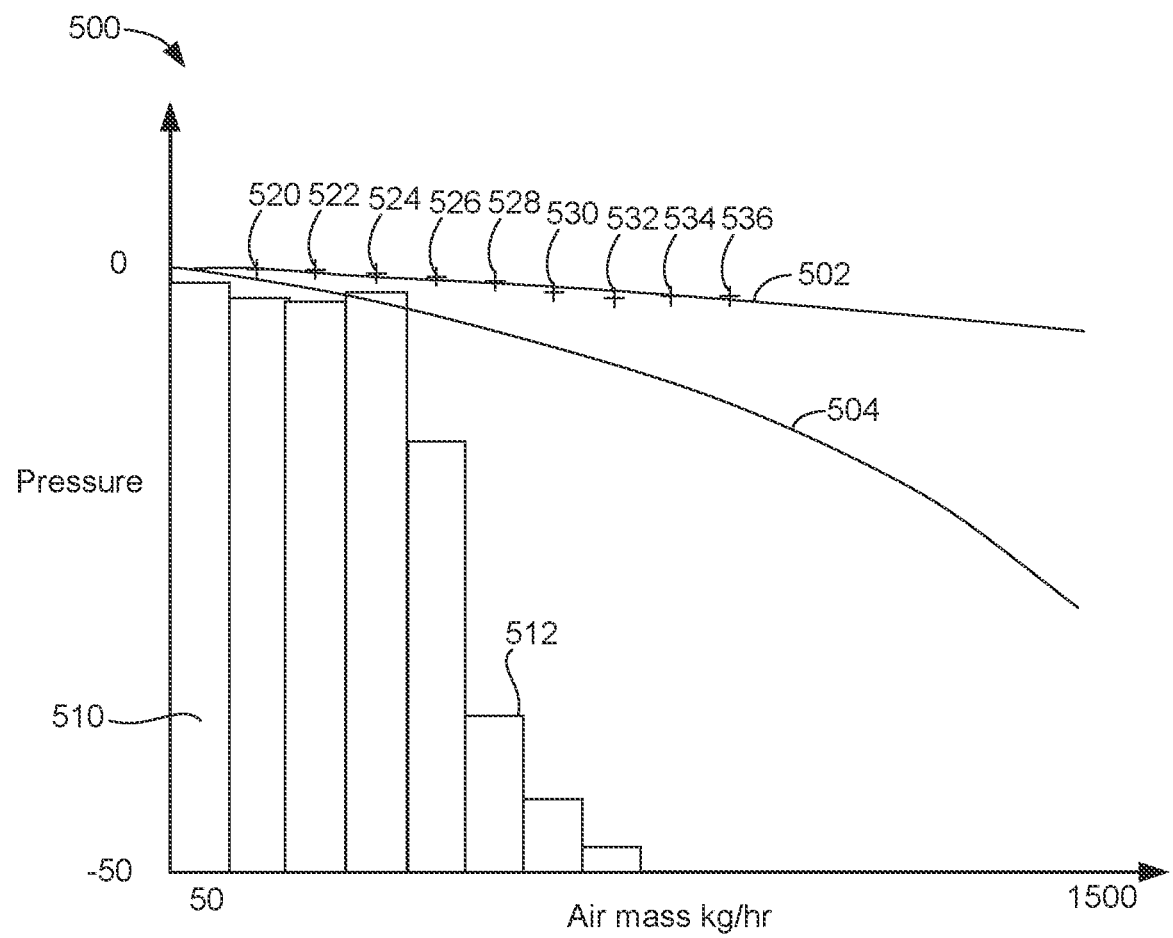
FIG. 5 shows a plot of a reference curve and a diagnostic curve for a PCV system.
Figure 6:
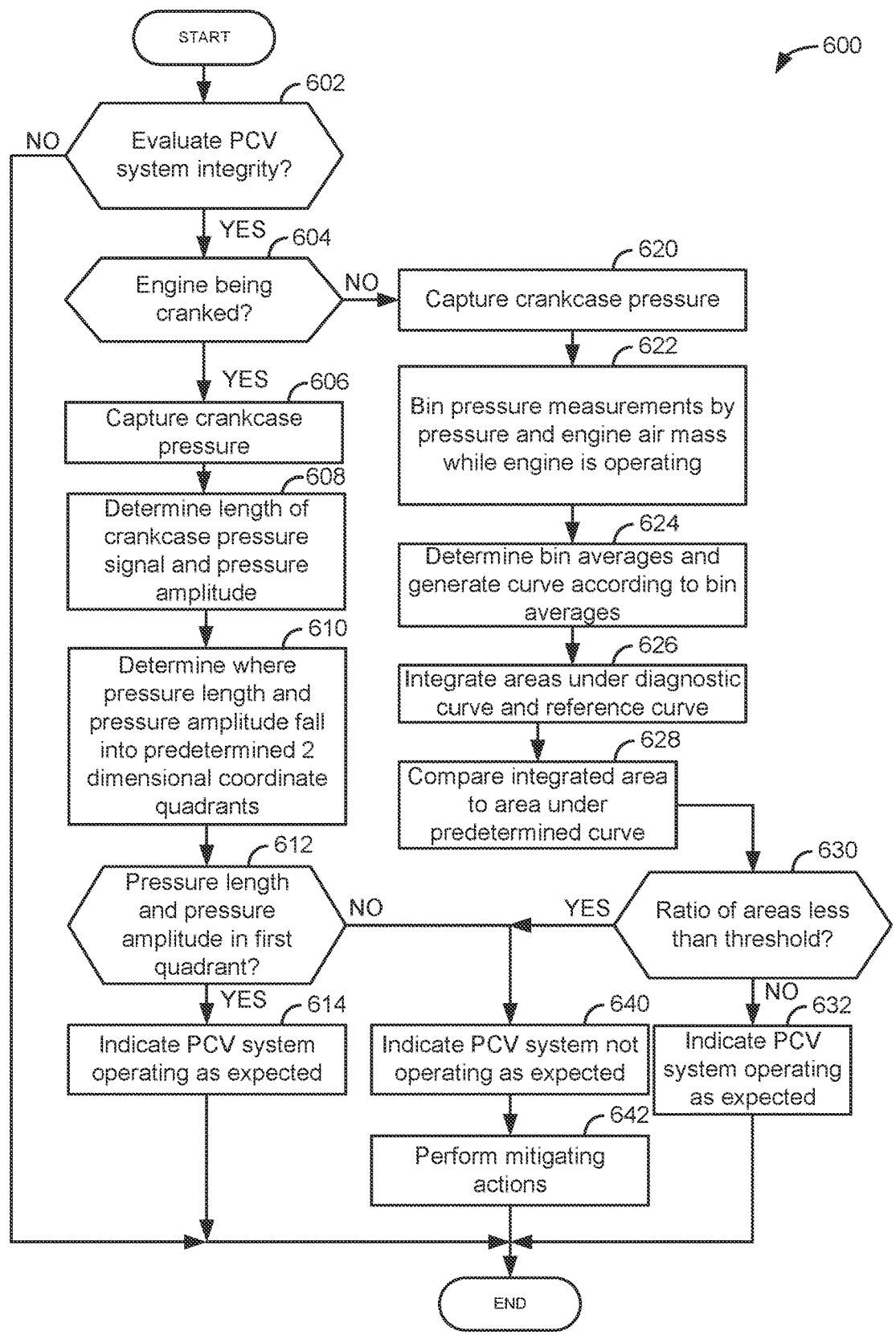
FIG. 6 shows a flowchart of an example method for operating an engine that includes a PCV system.

The present description is related to diagnosing a PCV system for a breach condition. The description also includes mitigating actions that may be applied when a breach is detected. The method and system may be applied to an engine as shown in FIG. 1. The engine may include a PCV system as shown in FIG. 2. Pressures in the PCV system may be observed as shown in FIG. 3. PCV diagnostic data may be separated into quadrants as shown in FIG. 4. A reference curve and a diagnostic curve are shown in FIG. 5. Finally, a flowchart of a method for operating an engine that includes a PCV system is shown in FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Intake cam 51 and exhaust cam 53 are covered via cam cover 59.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from intake boost chamber 46. Turbocharger compressor 162 draws air from air intake 42 to supply boost chamber 46. Exhaust gases spin turbine 164 which is coupled to compressor 162 via shaft 161. Turbocharger waste gate 163 may be opened to reduce boost pressure, or it may be closed to increase boost pressure.

Engine crankcase 193 may receive fresh air from the engine intake air system at a location upstream of throttle 62. For example, engine crankcase 193 may receive fresh air from the engine intake air system 42 at a location downstream of compressor 162. However, in some examples compressor 162 may be omitted. Thus, the engine crankcase may be ventilated by drawing air from the engine air intake system at a higher pressure location, and returning the air to the engine air intake system at a lower pressure location as discussed in more detail in the description of FIG. 2. Engine crankcase 193 may be bounded by oil pan 191 and engine block 196. Oil pan 191 may retain oil 195.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory (RAM) 108, keep alive memory 110, and a conventional data bus. Controller 12 is shown receiving various signals from sensors coupled to engine 10, in addition to those signals previously discussed, including: engine coolant temperature from temperature sensor 112 coupled to cooling sleeve 114; a position sensor 134 coupled to a driver demand pedal 130 for sensing driver demand adjusted by foot 132; a knock sensor for determining ignition of end gases (not shown); a measurement of engine manifold pressure from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Engine 10 and controller 12 may be included in a vehicle 100. In some examples, vehicle 100 may be a hybrid vehicle with multiple sources of torque available to one or more vehicle wheels 155. In other examples, vehicle 100 is a conventional vehicle with only an internal combustion engine 10, or an electric vehicle with only electric machine (s) 153. In the example shown, vehicle 100 includes engine 10 and an electric machine 153. Electric machine 153 may be a motor or a motor/generator. Crankshaft 40 of engine 10 and electric machine 153 are connected via a transmission 157 to vehicle wheels 155. Electric machine 153 is shown directly coupled to transmission 157. Transmission 157 may be a gearbox, a planetary gear system, or another type of transmission. The powertrain may be configured in various manners including as a parallel, a series, or a series-parallel hybrid vehicle.

Electric machine 153 receives electrical power from a traction battery 158 to provide torque to vehicle wheels 155. Electric machine 153 may also be operated as a generator to provide electrical power to charge battery 158, for example during a braking operation.

Referring now to FIG. 2, a schematic depiction of a PCV system 250 for engine 10 is shown. PCV system 250 includes a PCV hose 212, a PCV valve 202, crankcase 193, a PCV breather hose 208, and oil separator 210, and a pressure sensor 206. In this example, one side of breather hose 208 is coupled to engine air intake 42 downstream of mass air flow sensor 120 and upstream of compressor 162. The other side of breather hose 208 is coupled to oil separator 210, and oil separator may be under a cam cover 59. A passage (not shown) may couple crankcase 193 to an area under the cam cover 59 so that gases in the crankcase may be exchanged via breather hose 208 and PCV hose 212. One side of PCV line 212 is coupled to intake manifold 44 and the other side of PCV line 212 is coupled to cam cover 59. Compressor 162 may pressurize air entering intake manifold 44 via throttle 62 and charge air cooler 211.

Arrows 218 indicate gas flow directions when engine 10 is under boost and arrows 216 indicate gas flow directions when engine 10 is not under boost (e.g., when there is a vacuum in intake manifold 44). PCV valve 202 may open and close responsive to pressure differences across PCV valve 202. Alternatively, PCV valve 202 may open and close in response to a signal from controller 12 shown in FIG. 1.

Thus, the system of FIGS. 1 and 2 provides for an engine system, comprising: an engine including a pressure sensor and a positive crankcase ventilation system; a human/machine interface; and a controller including executable instructions stored in non-transitory memory that cause the controller to provide an indication of degradation of the positive crankcase ventilation system in response to a ratio. The engine system includes where the ratio is a ratio of integration of a diagnostic curve divided by integration of a reference curve. The engine system includes where the diagnostic curve is generated via regression of air mass and pressure data. The engine system includes where the reference curve is a curve representing a desired response from a functioning positive crankcase ventilation system. The engine system further comprises additional instructions to adjust an actuator to mitigate degradation of the positive crankcase ventilation system. The engine system includes where the actuator is a turbocharger waste gate, and further comprising: additional instructions to reduce boost via adjusting the waste gate. The engine system includes where the actuator is a fuel injector, and further comprising: additional instructions to adjust operation of the fuel injector. The engine system includes where the actuator is an ignition coil, and further comprising: additional instructions to adjust operation of the ignition coil.

Referring now to FIG. 3, plots of prophetic example PCV system pressures versus time are shown. The first plot from the top of FIG. 3 is a plot of PCV system pressure versus time for a functioning PCV system. The vertical axis represents PCV system pressure and PCV system pressure increases in the direction of the vertical axis arrow. The horizontal axis represents time and time increases from the left side of the plot to the right side of the plot. Trace or line 302 represents a pressure in the PCV system during an engine cranking period.

The second plot from the top of FIG. 3 is a plot of PCV system pressure versus time for a degraded PCV system (e.g., a PCV system having a breach). The vertical axis represents PCV system pressure and PCV system pressure increases in the direction of the vertical axis arrow. The horizontal axis represents time and time increases from the left side of the plot to the right side of the plot. Trace or line 304 represents a pressure in the PCV system during an engine cranking period.

It may be observed that there are significant pressure pulsations in the first plot from the top of FIG. 3. The pressure pulsations may be due to pressure changes in the engine crankcase during engine cranking. On the other hand, pressure pulsations in the second plot from the top of FIG. 3 are reduced as compared to the pressure pulsations that are shown in the first plot from the top of FIG. 3. The lower pressure pulsations in the second plot from the top of FIG. 3 may be due to a breach in the PCV system.

The inventors have determined that the length of the pressure signal combined with an amplitude range of the pressure signal may be indicative of PCV degradation, or lack thereof. The length of the pressure signal combined with an amplitude range of the pressure signal may also increase separation between degraded and non-degraded indications for the PCV system.

The length of line 302 from time t0 to time t1 may be determined as described in the description of FIG. 6 by determining line lengths between data points. Line 320 may be formed by a connecting a plurality of data points via a plurality of line segments. For example, data points 350 and 352 may be data points that form pressure signal 302. The length of pressure signal 302 may be calculated by determining line lengths between data points and summing the line lengths between the data points.

Referring now to FIG. 4, a plot showing pressure signal line length and pressure amplitude range pairs for degraded and non-degraded PCV systems are shown. Plot 400 includes a vertical axis and a horizontal axis. The vertical axis represents pressure signal line length. The horizontal axis represents pressure amplitude range. Each symbol 402, 404, 406, 408, 410, and other none numbered symbols represents a pressure line length and pressure amplitude range pair. Circular symbols 402 represent data pairs for a fully functioning PCV system. Cross or plus symbols 404 represent data pairs for a PCV system having an 11 millimeter breach on a "clean" side of a PCV valve. X symbols 408 represent data pairs for a PCV system having an 11 millimeter breach on a "dirty" side of a PCV valve. Asterisk symbols 406 represent data pairs for a PCV system having "clean" side of a breather hose disconnected. Circle/line symbols 410 represent data pairs for a PCV system having a "dirty" side of a breather hose disconnected. The "clean" side is a side of an oil separator that is nearest to an engine air intake and that has had oil removed from air. The "dirty" side is a side of an oil separator that is furthest from the engine air intake and that has not had oil removed from air.

In this example, plot 400 is separated into four quadrants. The first quadrant is indicated by I. The second quadrant is indicated by II. The third quadrant is indicated by III. The fourth quadrant is indicated by IV. The quadrants are defined via a first threshold 420 and a second threshold 422. Thus, for a data pair to land in the first quadrant, the pressure line length needs to exceed the first threshold 420 and exceed the second threshold 422. For the data pair to land in the third quadrant, the pressure line length needs to be less than the first threshold 420 and less than the second threshold 422.

Referring now to FIG. 5, a plot 500 showing a graphical representation of a portion of a method to determine the presence or absence of PCV system degradation is shown. Plot 500 includes a vertical axis and a horizontal axis. The vertical axis represents pressure in the PCV system with offset removed and the horizontal axis represents engine air mass.

PCV system pressure may be stored in bins (e.g., 510 and 512) and pressure values in the bins may be averaged to generate a set of data points (e.g., 520-536). A diagnostic curve 502 may be determined by a least squares regression fit to the set of data points. The diagnostic curve represents performance of the PCV system at present engine operating conditions, and the present engine operating conditions may include operating conditions over a drive cycle or a portion of a vehicle drive cycle.

Plot 500 also shows a reference curve 504. Reference curve 504 may be determined from pressure of a known fully operable and functioning PCV system. Reference curve 504 may be determined before a vehicle is manufactured and it may be stored in controller non-transitory memory. The reference curve 504 may be a basis for evaluating whether or not a PCV system is operating as may be expected. Method 600 provided greater detail regarding how reference curve 504 and diagnostic curve 502 may be compared.

Referring now to FIG. 6, a flowchart of an example method for operating an engine having a PCV system is shown. The method of FIG. 6 may be performed in cooperation with the system of FIGS. 1 and 2. In addition, at least portions of the method of FIG. 6 may be incorporated as executable instructions stored in non-transitory memory while other portions of the method may be performed via a controller transforming operating states of devices and actuators in the physical world.

At 602, method 600 judges if the PCV system is to be evaluated for integrity (e.g., a breach). In one example, method 600 may judge that the PCV system is to be evaluated for a breach condition each while the engine is rotating during a drive cycle, at predetermined time intervals, or at predetermined driving intervals (e.g., every 200 miles). If conditions are present to evaluate the PCV system, the answer is yes and method 600 proceeds to 604. Otherwise, the answer is no and method 600 exits.

At 604, method 600 judges if the engine is being cranked (e.g., rotated via an electric machine without combustion in the engine's cylinders). If so, the answer is yes and method 600 proceeds to 606. Otherwise, the answer is no and method 600 proceeds to 620.

At 606, method 600 samples and stores output of a PCV system pressure sensor (e.g., 206 of FIG. 2) as signal in controller RAM memory for a predetermined amount of time (e.g., 5 seconds while the engine is being cranked). In addition, method 600 may store a time vector (e.g., time stamp values of a clock recorded at each sample time) to controller RAM memory so that the PCV pressure sensor signal may be referenced to time. Method 600 may sample the output of the PCV sensor via analog to digital converters in the controller's I/O. Method 600 proceeds to 608.

At 608, method 600 determines a length of the CPV pressure signal. The length of the PCV signal may be determined via the following equation:

$$\text{Length} = \sum_{i=1}^{i=N} \sqrt{(p(i) - p(i-1))^2 + (t(i) - t(i-1))^2}$$

where Length is the length of the PCV pressure signal, N is the number of data points, p is PCV pressure at sample i, i is the sample number, and t is time. Thus, the signal length is determined according to the change in pressure and the change in time between pressure samples. Method 600 also determines the PCV signal pressure amplitude via the following equation:

$$\text{amplitude} = \max(p) - \min(p)$$

where amplitude is the pressure amplitude for the PCV pressure signal, max is a function that returns a maximum value of the PCV pressure p in the predetermined period, and min is a function that returns a minimum value of the PCV pressure p in the predetermined period. Method 600 proceeds to 610.

At 610, method 600 judges where the length of the PCV pressure signal and the amplitude of the PCV pressure signal fall within four quadrants of a plot (e.g., as shown in FIG. 4). In one example, if the signal length is less than a first threshold and the amplitude is less than a second threshold, the length and amplitude fall into the third quadrant and PCV degradation may be determined. If the signal length is greater than the first threshold and the amplitude is greater than the second threshold, the length and amplitude fall into the first quadrant and PCV degradation is not determined. Method 600 proceeds to 612.

At 612, method 600 judges if the PCV pressure signal length and amplitude fall into the first quadrant. If so, the answer is yes and method 600 proceeds to 614. Otherwise, the answer is no and method 600 proceeds to 640.

At 614, method 600 indicates that the PCV system is operating as expected or properly. Method 600 proceeds to exit.

At 640, method 600 indicates that the PCV system is not operating as expected. Method 600 may display a message to a human/machine interface for the vehicle to be serviced. Method 600 proceeds to 642.

At 642, method 600 may optionally perform mitigating actions. For example, method 600 may reduce boost that is available to the engine so that pressures in the PCV system may be reduced, thereby reducing a possibility of engine emissions. In addition, method 600 may adjust engine spark timing and fuel flow to compensate for the reduced engine boost. Method 600 proceeds to exit.

At 620, method 600 samples and stores output of a PCV system pressure sensor (e.g., 206 of FIG. 2) as signal in controller RAM memory for a predetermined amount of time (e.g., 5 minutes while the engine is running and not being cranked). In addition, method 600 may store a time vector (e.g., time stamp values of a clock recorded at each sample time) and an engine mass air flow vector to controller RAM memory so that the PCV pressure sensor signal may be referenced to time and engine air flow. Method 600 may sample the output of the PCV sensor via analog to digital converters in the controller's I/O. In some examples, method 600 may not begin storing pressure values at 620 until select conditions are met. For example, method 600 may not begin collecting pressures until the engine has reached operating temperature (e.g., greater than 90 degrees Celsius). Method 600 proceeds to 622.

At 622, method 600 bins pressure measurements from PCV system pressure sensor by engine mass air flow at the time the pressure measurement is taken and the measured pressure as shown in FIG. 5. For example, there may be ten bins for the range of engine air flows. Thus, in this example, all of the PCV pressure measurements may be stored in ten bins. Method 600 proceeds to 624.

At 624, method 600 determines average pressures for the pressures that have been organized by pressure and engine mass air flow. Thus, for every bin for particular engine air flows and PCV pressures, there is an average pressure for the PCV system. Accordingly, if there are ten bins, there are ten average pressures, one for each bin. Method 600 proceeds to 626.

At 626, method 600 performs a least squares curve fit on the pressures in the ten bins and determines an equation of a polynomial line from the average pressures in the bins. The curve that is generated from the pressures that have been placed in bins may be referred to as a diagnostic curve. Method 600 integrates the area under the diagnostic curve via the following equation:

$$diagcrvarea = \int_{start}^{end} diagcurvda$$

where diagcrvarea is the area under the diagnostic curve, start is the starting limit of the integral, end is the ending limit of the integral, diagcury is the curve found by fitting the averages of the binned PCV pressure data, and da is the differences between engine air flow values as the limit approaches zero. Method 600 integrates the area under the reference curve in a similar way and with the same limits. Thus, method 600 generates an area under the diagnostic curve and an area under the reference curve. Method 600 proceeds to 628.

At 628, method 600 compares the area under the diagnostic curve to the area under the reference curve via the following equation:

$$Curveratio = \frac{diagcrvarea}{refcrvarea}$$

where Curveratio is the ratio between the reference curve area (refcrvarea) and the diagnostic curve (diagcrvarea). Method 600 proceeds to 630.

At 630, method 600 judges if the value of Curveratio is less than a first threshold. If so, the answer is yes and method 600 proceeds to 640. Otherwise, the answer is no and method 600 proceeds to 632. Thus, when the value of Curveratio is close to one, the answer is no and method 600 proceeds to 632. If the value of Curveratio is not close to one, the answer is yes and method 600 proceeds to 640.

At 632, method 600 indicates that the PCV system is operating as expected or properly. Method 600 proceeds to exit.

It should be noted that during some conditions indications of PCV system degradation or non-degradation from steps 606-612 may have priority over a determination of PCV system degradation or non-degradation as determined from steps 620-630, and vice-versa. The determination between which steps have priority may be based on separation between data generated in the respective steps for determination of degradation, or absence thereof.

Thus, the method of FIG. 6 provides for a method for operating an engine, comprising: storing a signal indicative of a pressure into memory of a controller for a predetermined amount of time in response to cranking an engine; and indicating a presence or absence of a positive crankcase ventilation (PCV) system breach in response to a length of the signal and an amplitude range of the signal. The method further comprises adjusting one or more actuators in response to the length of the signal and the amplitude range of the signal. The method includes where the amplitude range is determined via subtracting a minimum valve of the signal from a maximum value of the signal. The method further comprises indicating the presence of the PCV system breach in response to the length of the signal being less than a first threshold and the amplitude range of the pressure being less than a second threshold. The method further comprises indicating the absence of the PCV system breach in response to the length of the signal being greater than a first threshold and the amplitude range of the pressure being greater than a second threshold. The method includes where the signal is output from a crankcase pressure sensor. The method further comprises storing a time signal into the memory of the controller for the predetermined amount of time.

The method of FIG. 6 also provides for a method for operating an engine, comprising: indicating a presence or absence of a positive crankcase ventilation (PCV) system breach via a human/machine interface based on a first method performed during engine cranking; and indicating a presence or absence of a positive crankcase ventilation (PCV) system breach via the human/machine interface based on a second method performed warm engine operation at engine speeds above engine cranking speed. The engine method includes where the first method determines a length of a signal and an amplitude range of the signal. The engine method includes where the second method determines a ratio the ratio being a ratio of integration of a diagnostic curve divided by integration of a reference curve. The engine method further comprises adjusting one or more actuators when there is an indication of the presence of degradation of the PCV system. The engine method includes where the one or more actuators include a turbocharger waste gate.

As will be appreciated by one of ordinary skill in the art, the method described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine, comprising:
storing a signal indicative of a pressure into memory of a controller for a predetermined amount of time in response to cranking an engine; and
indicating a presence or absence of a positive crankcase ventilation (PCV) system breach in response to a length of the signal and an amplitude range of the signal.

2. The method of claim 1, further comprising adjusting one or more actuators in response to the length of the signal and the amplitude range of the signal.

3. The method of claim 1, where the amplitude range is determined via subtracting a minimum valve of the signal from a maximum value of the signal.

4. The method of claim 1, further comprising indicating the presence of the PCV system breach in response to the length of the signal being less than a first threshold and the amplitude range of the pressure being less than a second threshold.

5. The method of claim 1, further comprising indicating the absence of the PCV system breach in response to the length of the signal being greater than a first threshold and the amplitude range of the pressure being greater than a second threshold.

6. The method of claim 1, where the signal is output from a crankcase pressure sensor.

7. The method of claim 1, further comprising storing a time signal into the memory of the controller for the predetermined amount of time.

8. An engine system, comprising:
an engine including a pressure sensor and a positive crankcase ventilation system;
a human/machine interface; and
a controller including executable instructions stored in non-transitory memory that cause the controller to store a signal indicative of a pressure into the non-transitory memory of the controller for a predetermined amount of time in response to cranking the engine, and to indicate a presence or absence of a positive crankcase ventilation (PCV) system breach in response to a length of the signal and an amplitude range of the signal.

9. The engine system of claim 8, where the instructions further cause the controller to adjust one or more actuators in response to the length of the signal and the amplitude range of the signal.

10. The engine system of claim 9, where the amplitude range is determined via subtracting a minimum valve of the signal from a maximum value of the signal.

11. The engine system of claim 9, where the instructions further cause the controller to indicate the presence of the PCV system breach in response to the length of the signal being less than a first threshold and the amplitude range of the pressure being less than a second threshold.

12. The engine system of claim 8, where the instructions further cause the controller to indicate the absence of the PCV system breach in response to the length of the signal being greater than a first threshold and the amplitude range of the pressure being greater than a second threshold.

13. The engine system of claim 12, further comprising a crankcase pressure sensor, where the signal is output from the crankcase pressure sensor.

14. The engine system of claim 12, where the instructions further cause the controller to store a time signal into the non-transitory memory of the controller for the predetermined amount of time.

15. A method for operating an engine, comprising:
   indicating a presence or absence of a positive crankcase ventilation (PCV) system breach via a human/machine interface based on a first method performed during engine cranking; and
   indicating a presence or absence of a positive crankcase ventilation (PCV) system breach via the human/machine interface based on a second method performed warm engine operation at engine speeds above engine cranking speed, where the first method determines a length of a signal and an amplitude range of the signal.

16. The engine method of claim 15, where the second method determines a ratio the ratio being a ratio of integration of a diagnostic curve divided by integration of a reference curve.

17. The engine method of claim 15, further comprising adjusting one or more actuators when there is an indication of the presence of degradation of the PCV system.

18. The engine method of claim 17, where the one or more actuators include a turbocharger waste gate.

* * * * *